(12) United States Patent
Kaise

(10) Patent No.: US 7,352,864 B2
(45) Date of Patent: Apr. 1, 2008

(54) DISPLAY DEVICE

(75) Inventor: Naoki Kaise, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 830 days.

(21) Appl. No.: 10/387,577

(22) Filed: Mar. 14, 2003

(65) Prior Publication Data

US 2003/0184572 A1  Oct. 2, 2003

(30) Foreign Application Priority Data

Mar. 26, 2002  (JP) .............................. 2002-085535

(51) Int. Cl.
*H04N 7/167* (2006.01)
(52) U.S. Cl. ................................... 380/205
(58) Field of Classification Search ................ 380/205; 345/698
See application file for complete search history.

(56) References Cited

U.S. PATENT DOCUMENTS

| | | | | |
|---|---|---|---|---|
| 4,163,253 A | * | 7/1979 | Morio et al. ................. 380/204 |
| 4,257,073 A | * | 3/1981 | Tatami ........................ 386/71 |
| 4,819,098 A | * | 4/1989 | Ryan ........................... 386/94 |
| 5,410,363 A | * | 4/1995 | Capen et al. ................. 348/679 |
| 5,510,900 A | * | 4/1996 | Shirochi et al. .............. 386/94 |
| 5,579,029 A | * | 11/1996 | Arai et al. ................... 345/698 |
| 5,739,864 A | * | 4/1998 | Copeland ..................... 348/473 |
| 5,847,773 A | * | 12/1998 | Lagoni et al. ................ 348/603 |
| 5,953,417 A | * | 9/1999 | Quan .......................... 380/203 |
| 6,008,791 A | * | 12/1999 | Arai et al. ................... 345/428 |
| 6,025,882 A | * | 2/2000 | Geshwind .............. 375/240.26 |
| 6,041,158 A | * | 3/2000 | Sato ............................ 386/1 |
| 6,091,822 A | * | 7/2000 | Mellows et al. ............. 380/210 |
| 6,151,018 A | * | 11/2000 | Webb et al. ................. 715/722 |
| 6,212,325 B1 | * | 4/2001 | Kori ............................ 386/1 |
| 6,263,396 B1 | * | 7/2001 | Cottle et al. ................ 710/263 |
| 6,263,506 B1 | * | 7/2001 | Ezaki et al. ................ 725/116 |
| 6,266,480 B1 | * | 7/2001 | Ezaki et al. ................. 386/94 |
| 6,341,375 B1 | * | 1/2002 | Watkins ..................... 725/100 |
| 6,353,488 B1 | * | 3/2002 | Hieda et al. ........... 348/207.99 |
| 6,356,704 B1 | * | 3/2002 | Callway et al. ............... 386/94 |
| 6,404,889 B1 | * | 6/2002 | Ryan et al. ................. 380/201 |
| 6,424,716 B1 | * | 7/2002 | Quan .......................... 380/221 |
| 6,501,842 B2 | * | 12/2002 | Quan .......................... 380/221 |
| 6,542,609 B1 | * | 4/2003 | Ryan et al. ................. 380/210 |
| 6,661,414 B1 | * | 12/2003 | Miyamoto ................... 345/213 |
| 6,750,917 B2 | * | 6/2004 | Yamada et al. ............. 348/478 |
| 6,839,433 B1 | * | 1/2005 | Quan .......................... 380/206 |
| 6,862,400 B1 | * | 3/2005 | Lee et al. ..................... 386/94 |

(Continued)

*Primary Examiner*—Nasser Moazzami
*Assistant Examiner*—David Garcia Cervetti
(74) *Attorney, Agent, or Firm*—Westerman, Hattori, Daniels & Adrian, LLP.

(57) ABSTRACT

A display device comprises a nonvolatile memory for storing an amount of adjustment obtained in a blanking adjustment most recently performed for a particular video signal, means for judging whether or not the particular video signal is inputted, means for masking a region defined by the amount of adjustment, obtained in the blanking adjustment, stored in the nonvolatile memory at a black level when the particular video signal is inputted, means for allowing the blanking adjustment based on a user operation only when the particular video signal is inputted, and means for updating the amount of adjustment, obtained in the blanking adjustment, stored in the nonvolatile memory, when it is changed by the user operation, to the changed amount of blanking adjustment.

12 Claims, 4 Drawing Sheets

U.S. PATENT DOCUMENTS

| | | | |
|---|---|---|---|
| 6,909,879 B1 * | 6/2005 | Centore, III | 455/63.1 |
| 6,931,547 B2 * | 8/2005 | Quan | 386/94 |
| 6,940,561 B1 * | 9/2005 | Glaab et al. | 348/724 |
| 6,950,520 B1 * | 9/2005 | Ryan et al. | 380/200 |
| 7,013,145 B1 * | 3/2006 | Centore, III | 455/454 |
| 2001/0038422 A1 * | 11/2001 | Yamada et al. | 348/478 |
| 2004/0047469 A1 * | 3/2004 | Ryan et al. | 380/210 |
| 2006/0045266 A1 * | 3/2006 | Wonfor et al. | 380/204 |
| 2007/0118812 A1 * | 5/2007 | Kesteloot et al. | 715/800 |

* cited by examiner

DISPLAY DEVICE

BACKGROUND OF THE INVENTION

1. Field of the Invention

The present invention relates to a display device using a light bulb that modulates the intensity of light, for example, a liquid crystal panel or a digital mirror device (DMD).

2. Description of the Prior Art

In recent years, Macrovision has been introduced into DVD (Digital Versatile Disc) software or the like in order to prevent copying for the purpose of protecting the copyright of the contents of a movie or the like. A Macrovision signal is superimposed on a vertical blanking period of a video signal, as shown in FIG. 4, and makes it impossible to normally record an output source by erroneously operating an AGC (Automatic Gain Control) in a video recording device.

In a case where the contents which have been subjected to copy protection by Macrovision are displayed by a liquid crystal projector, when the aspect ratio of an input signal and the aspect ratio of a liquid crystal panel differ from each other, the Macrovision signal superimposed on the vertical blanking period may, in some cases, be displayed as a video signal.

When the aspect ratio of the input signal is 4×3 (width× length), while the aspect ratio of the liquid crystal panel is 5×4 (width×length), for example, the video signal is written into the liquid crystal panel such that the width of the liquid crystal panel coincides with the width of the video signal. Accordingly, the length of the video signal is smaller than the length of the liquid crystal panel, so that the Macrovision signal superimposed on the vertical blanking period is written into the liquid crystal panel.

SUMMARY OF THE INVENTION

An object of the present invention is to provide a display device capable of performing a blanking adjustment only when a particular video signal is inputted.

Another object of the present invention is to provide a display device capable of automatically masking, when a particular video signal is inputted, a region defined by an amount of adjustment obtained in a blanking adjustment most recently performed for the particular video signal at a black level.

A first display device according to the present invention is characterized by comprising a nonvolatile memory for storing an amount of adjustment obtained in a blanking adjustment most recently performed for a particular video signal; means for judging whether or not the particular video signal is inputted; means for masking a region defined by the amount of adjustment, obtained in the blanking adjustment, stored in the nonvolatile memory at a black level when the particular video signal is inputted; means for allowing the blanking adjustment based on a user operation only when the particular video signal is inputted; and means for updating the amount of adjustment, obtained in the blanking adjustment, stored in the nonvolatile memory, when it is changed by the user operation, to the changed amount of blanking adjustment.

A second display device according to the present invention is characterized by comprising a nonvolatile memory for storing an amount of adjustment obtained in a blanking adjustment most recently performed for a particular video signal; a circuit for judging whether or not the particular video signal is inputted; a circuit for masking a region defined by the amount of adjustment, obtained in the blanking adjustment, stored in the nonvolatile memory at a black level when the particular video signal is inputted; a circuit for allowing the blanking adjustment based on a user operation only when the particular video signal is inputted; and a circuit for updating the amount of adjustment, obtained in the blanking adjustment, stored in the nonvolatile memory, when it is changed by the user operation, to the changed amount of blanking adjustment.

A third display device according to the present invention is characterized by comprising a nonvolatile memory for storing an amount of adjustment obtained in a blanking adjustment most recently performed for a particular video signal; means for judging whether or not the particular video signal is inputted; means for masking a region defined by the amount of adjustment, obtained in the blanking adjustment, stored in the nonvolatile memory at a black level when the particular video signal is inputted; means for allowing the blanking adjustment based on a user operation only when the particular video signal is inputted; means for on-screen displaying, at the time of the blanking adjustment, the current amount of blanking adjustment; and means for updating the current amount of blanking adjustment on-screen displayed, when it is changed by the user operation, to the changed amount of blanking adjustment as well as updating the amount of adjustment, obtained in the blanking adjustment, stored in the nonvolatile memory to the changed amount of blanking adjustment.

A fourth display device according to the present invention is characterized by comprising a nonvolatile memory for storing an amount of adjustment obtained in a blanking adjustment most recently performed for a particular video signal; a circuit for judging whether or not the particular video signal is inputted; a circuit for masking a region defined by the amount of adjustment, obtained in the blanking adjustment, stored in the nonvolatile memory at a black level when the particular video signal is inputted; a circuit for allowing the blanking adjustment based on a user operation only when the particular video signal is inputted; a circuit for on-screen displaying, at the time of the blanking adjustment, the current amount of blanking adjustment; and a circuit for updating the current amount of blanking adjustment on-screen displayed, when it is changed by the user operation, to the changed amount of blanking adjustment as well as updating the amount of adjustment, obtained in the blanking adjustment, stored in the nonvolatile memory to the changed amount of blanking adjustment.

An example of the particular video signal in each of the above-mentioned first to fourth display devices is a video signal into which a signal for copy protection different from the video signal may be inserted in a blanking period.

An example of the particular video signal in each of the first to fourth display devices is a video signal which may be subjected to copy protection by Macrovision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
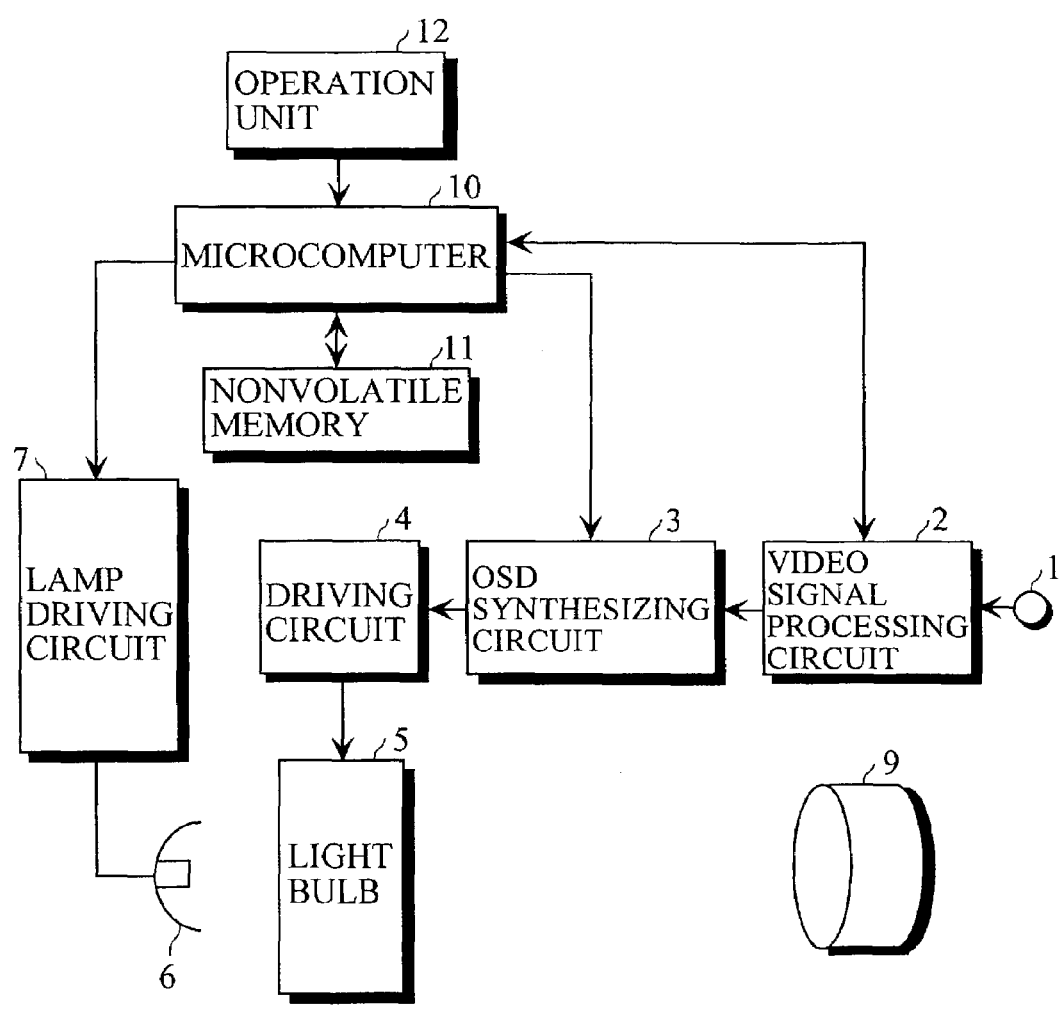
FIG. 1 is a block diagram showing the configuration of a liquid crystal projector.

Referring now to the drawings, description is made of an embodiment in a case where the present invention is applied to a liquid crystal projector.

FIG. 1 illustrates the configuration of the liquid crystal projector.

A video signal inputted to a video input terminal 1 is fed to a video signal processing circuit 2. The video signal processing circuit 2 performs signal judgment processing, scaling processing, and blanking adjustment processing, for example. The video signal outputted from the video signal processing circuit 2 is fed to an OSD synthesizing circuit 3, where it is synthesized with OSD (On-Screen Display) data. The video signal outputted from the OSD synthesizing circuit 3 is written into a light bulb (e.g., LCD (Liquid Crystal Display)) by a driving circuit 4.

The video written into the light bulb 5 is projected on a screen (not shown) through a projection lens 9 by the function of a light source lamp 6. The light source lamp 6 is driven by a lamp driving circuit 7.

A microcomputer 10 comprises a nonvolatile memory 11 such as an EEPROM (Electrically Erasable and Programmable Read Only Memory) in addition to a ROM and RAM (Random Access Memory) (not shown). A command from an operation unit 12 such as a keyboard or a remote control is inputted to the microcomputer 10. The microcomputer 10 controls the video signal processing circuit 2, the OSD synthesizing circuit 3, and the lamp driving circuit 7.

In the present embodiment, the microcomputer 10 comprises the function of performing a blanking adjustment on the basis of an operation performed by a service man (or a user).

Figure 2:
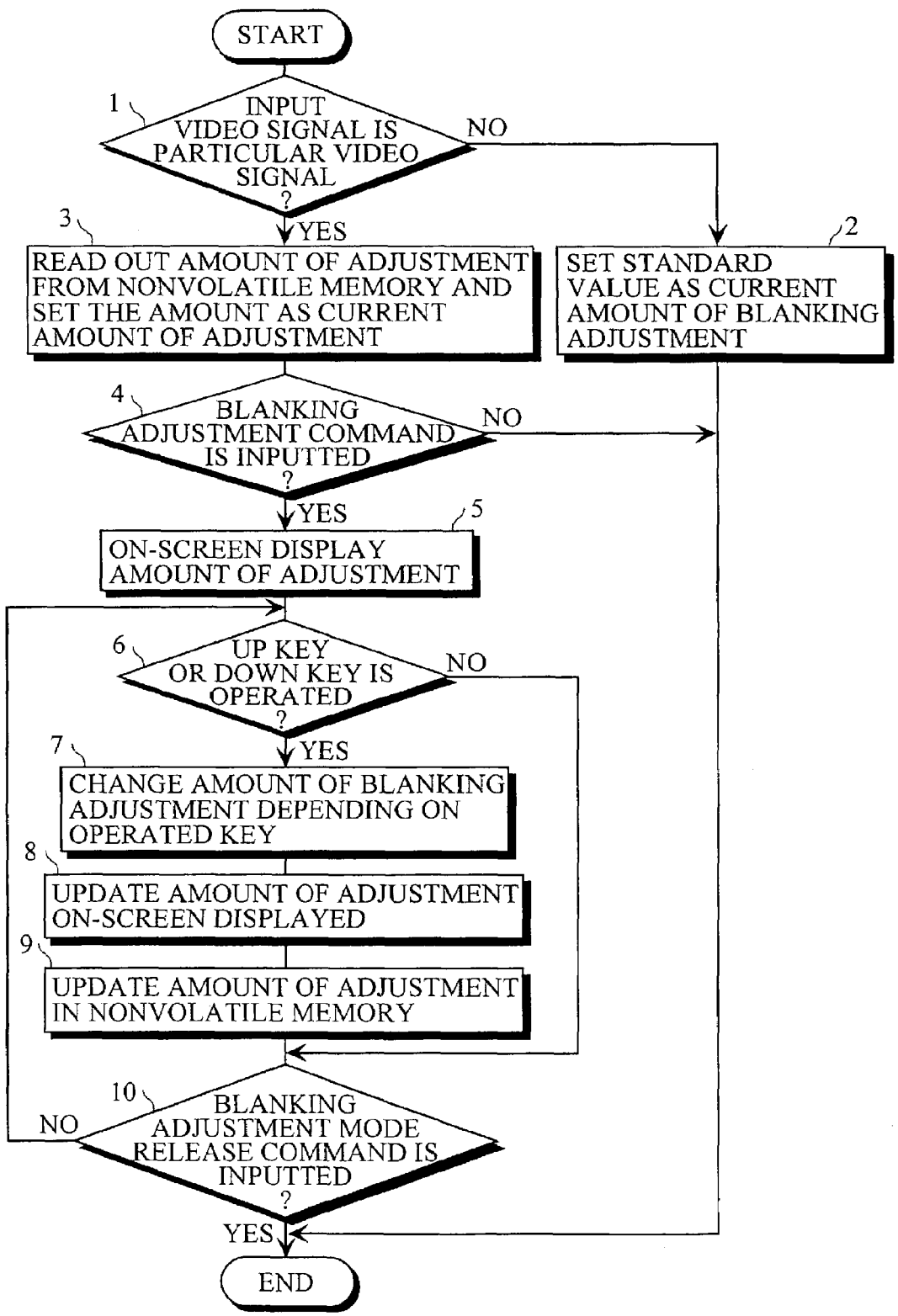
FIG. 2 is a flow chart showing the procedure for blanking adjustment processing performed by a microcomputer.

FIG. 2 shows the procedure for blanking adjustment processing by the microcomputer 10.

Examples of the type of blanking adjustment include blanking adjustments corresponding to an upper end, a lower end, a left end, and a right end of a screen. Description is made by taking as an example the blanking adjustment corresponding to the upper end of the screen.

The nonvolatile memory 11 shall store the standard value (e.g., 20) of an amount of adjustment obtained in the blanking adjustment corresponding to the upper end of the screen and store an amount of adjustment (e.g., 0 to 255) obtained in a blanking adjustment most recently performed for a video signal 480p from a DVD player which may be subjected to copy protection by Macrovision. The amount of adjustment (e.g., 0 to 255) is an amount for defining a region, to be masked at a black level, at the upper end of the screen, and represents the number of horizontal lines from an upper end of a liquid crystal panel to a lower end of the region to be masked.

The microcomputer 10 judges whether or not the input video signal judged by the video signal processing circuit 2 is the particular video signal (480p) on the basis of the type of the input video signal (step 1).

When the input video signal is not the particular video signal (480p), the microcomputer 10 reads out the standard value (20) of the amount of adjustment, obtained in the blanking adjustment, stored in the nonvolatile memory 11, and sets the standard value as the current amount of blanking adjustment in the video signal processing circuit 2 (step 2). The video signal processing circuit 2 masks a region (blanking region) at the upper end of the screen defined by the current amount of blanking adjustment set by the microcomputer 10 at a black level. Consequently, the current blanking adjustment is terminated, after which the program is returned to the step 1.

When the input video signal is the particular video signal (480p), the microcomputer 10 reads out the amount of adjustment, obtained in the blanking adjustment most recently performed for the particular video signal 480p, stored in the nonvolatile memory 11, and sets the read amount of adjustment as the current amount of blanking adjustment in the video signal processing circuit 2 (step 3). The video signal processing circuit 2 masks a region (blanking region) at the upper end of the screen defined by the current amount of blanking adjustment set by the microcomputer 10 at a black level.

The microcomputer 10 judges whether or not a blanking adjustment command is inputted from the operation unit 12 (step 4). The blanking adjustment command is inputted when a blanking adjustment mode key on the operation unit 12 is operated, for example. When no blanking adjustment command is inputted from the operation unit 12, the current blanking adjustment is terminated, after which the program is returned to the step 1.

Figure 3A:
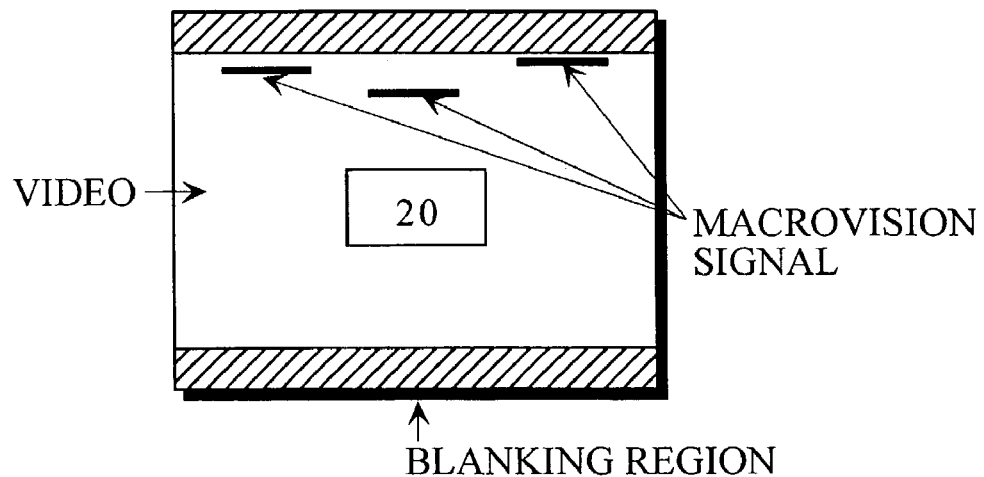
FIGS. 3a, 3b, and 3c are schematic views showing how a region, masked at a black level, corresponding to blanking is changed when a blanking adjustment is performed.

When it is judged in the step 4 that the blanking adjustment command is inputted from the operation unit 12, the microcomputer 10 enters a blanking adjustment mode, to on-screen display the current amount of blanking adjustment (20 in this example), as shown in FIG. 3a, for example (step 5).

It is judged whether or not the microcomputer 10 judges whether or not an UP cursor key or a Down cursor key out of cursor keys on the operation unit 12 is operated (step 6), and a blanking adjustment mode release command is inputted from the operation unit 12 (step 10). The blanking adjustment mode release command is inputted when a blanking adjustment mode release key on the operation unit 12 is operated, for example.

When the UP cursor key or the DOWN cursor key out of the cursor keys on the operation unit 12 is operated (step 6), the microcomputer 10 performs processing in the steps 7, 8, and 9. When the blanking adjustment mode release command is inputted (step 10), the microcomputer 10 terminates the current blanking adjustment, after which the program is returned to the step 1.

Description is made of processing in the case where the UP cursor key or the DOWN cursor key out of the cursor keys on the operation unit 12 is operated. When the UP cursor key or the DOWN cursor key is operated (step 6), the microcomputer 10 changes the current amount of blanking adjustment depending on the operated cursor key (step 7). When the UP cursor key is operated, for example, a predetermined offset value (1 in this example) is added to the current amount of blanking adjustment, to change the amount of blanking adjustment. When the DOWN cursor key is operated, a predetermined offset value (1 in this example) is subtracted from the current amount of blanking adjustment, to change the amount of blanking adjustment.

The microcomputer 10 updates the amount of blanking adjustment on-screen displayed to the changed amount of blanking adjustment (step 8), and updates the amount of adjustment, obtained in the blanking adjustment most recently performed, stored in the nonvolatile memory 11 to the changed amount of blanking adjustment (step 9).

Figure 3B:
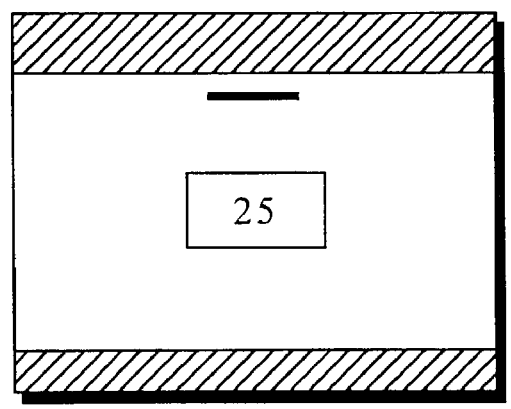
Figure 3C:
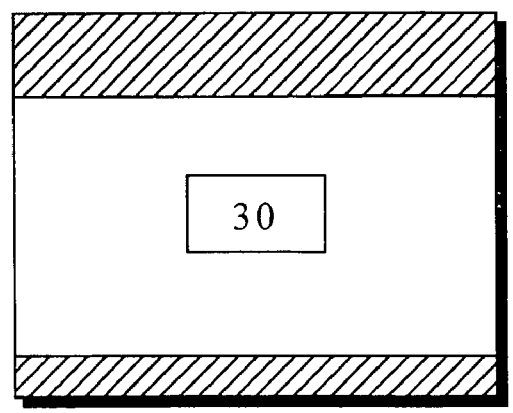
Figure 4:
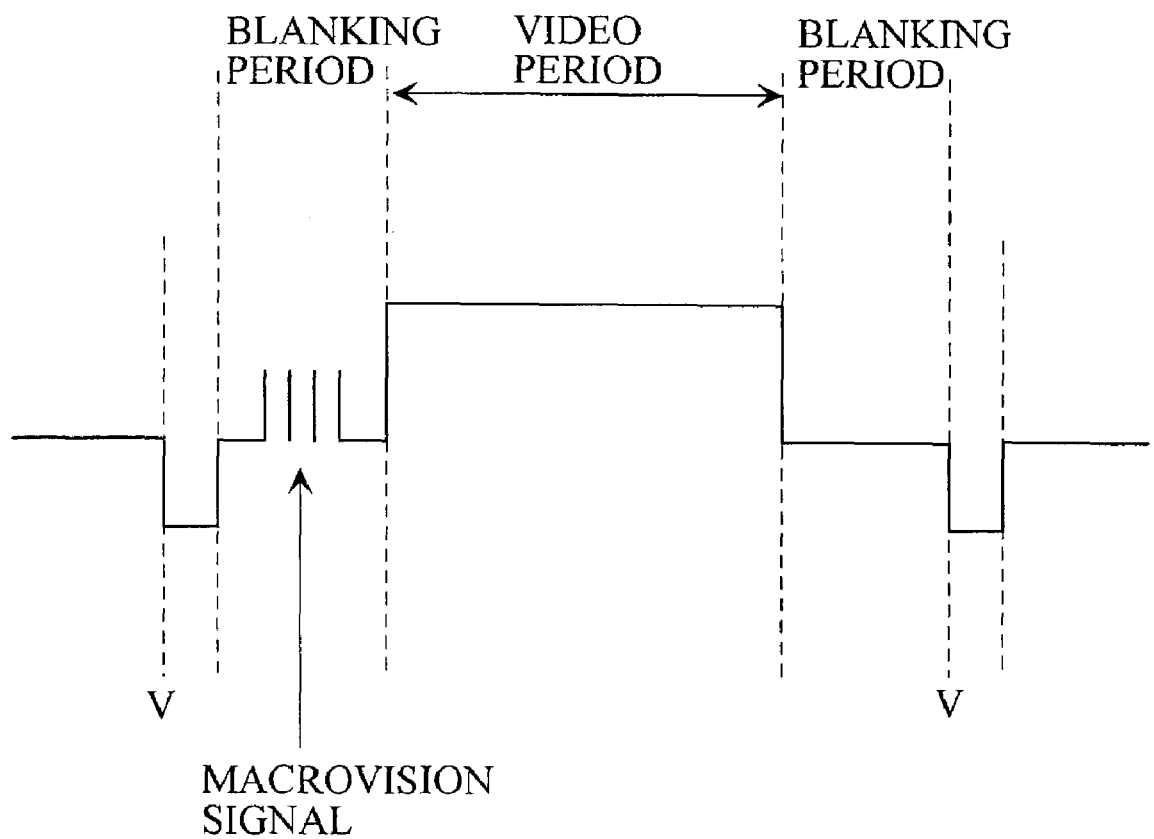
FIG. 4 is a waveform diagram showing a Macrovision signal superimposed on a vertical blanking period of a video signal.

Assuming that a video including a Macrovision signal as shown in FIG. 3a is displayed in the foregoing step 5, when the UP cursor key is operated, the amount of blanking adjustment is increased, so that a region, masked at a black level, corresponding to blanking on the upper side of the screen is increased, as shown in FIG. 3b. Further, when the UP cursor key is operated, the amount of blanking adjustment is further increased, so that the region, masked at the black level, corresponding to blanking on the upper side of the screen is further increased, as shown in FIG. 3c.

When the DOWN cursor key is operated, the region, masked at the black level, corresponding to blanking on the upper side of the screen is decreased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device comprising:
    a nonvolatile memory for storing an amount of adjustment obtained in a blanking adjustment most recently performed for a particular video signal;
    means for judging whether or not the particular video signal is inputted;
    means for masking a region defined by the amount of adjustment, obtained in the blanking adjustment, stored in the nonvolatile memory at a black level when the particular video signal is inputted;
    means for allowing the blanking adjustment based on a user input command operation only when the particular video signal is inputted;
    means for changing the amount of adjustment based on the user input command; and
    means for updating the amount of adjustment, obtained in the blanking adjustment, stored in the nonvolatile memory, when it is changed by the user input command operation, to the changed amount of blanking adjustment.

2. The display device according to claim 1, wherein the particular video signal is a video signal into which a signal for copy protection different from the video signal may be inserted in a blanking period.

3. The display device according to claim 1, wherein the particular video signal is a video signal which may be subjected to copy protection by MACROVISION.

4. A display device comprising:
    a nonvolatile memory for storing an amount of adjustment obtained in a blanking adjustment most recently performed for a particular video signal;
    a circuit for judging whether or not the particular video signal is inputted;
    a circuit for masking a region defined by the amount of adjustment, obtained in the blanking adjustment, stored in the nonvolatile memory at a black level when the particular video signal is inputted;
    a circuit for allowing the blanking adjustment based on a user input command operation only when the particular video signal is inputted;
    a circuit for changing the amount of adjustment based on the user input command; and
    a circuit for updating the amount of adjustment, obtained in the blanking adjustment, stored in the nonvolatile memory, when it is changed by the user input command operation, to the changed amount of blanking adjustment.

5. The display device according to claim 4, wherein the particular video signal is a video signal into which a signal for copy protection different from the video signal may be inserted in a blanking period.

6. The display device according to claim 4, wherein the particular video signal is a video signal which may be subjected to copy protection by MACROVISION.

7. A display device comprising:
    a nonvolatile memory for storing an amount of adjustment obtained in a blanking adjustment most recently performed for a particular video signal;
    means for judging whether or not the particular video signal is inputted;
    means for masking a region defined by the amount of adjustment, obtained in the blanking adjustment, stored in the nonvolatile memory at a black level when the particular video signal is inputted;
    means for allowing the blanking adjustment based on a user input command operation only when the particular video signal is inputted;
    means for on-screen displaying, at the time of the blanking adjustment, the current amount of blanking adjustment; and
    means for updating the current amount of blanking adjustment on-screen displayed, when it is changed by the user input command operation, to the changed amount of blanking adjustment as well as updating the amount of adjustment, obtained in the blanking adjustment, stored in the nonvolatile memory to the changed amount of blanking adjustment.

8. The display device according to claim 7, wherein the particular video signal is a video signal into which a signal for copy protection different from the video signal may be inserted in a blanking period.

9. The display device according to claim 7, wherein the particular video signal is a video signal which may be subjected to copy protection by MACROVISION.

10. A display device comprising:
    a nonvolatile memory for storing an amount of adjustment obtained in a blanking adjustment most recently performed for a particular video signal;
    a circuit for judging whether or not the particular video signal is inputted;
    a circuit for masking a region defined by the amount of adjustment, obtained in the blanking adjustment, stored in the nonvolatile memory at a black level when the particular video signal is inputted;
    a circuit for allowing the blanking adjustment based on a user input command operation only when the particular video signal is inputted;
    a circuit for on-screen displaying, at the time of the blanking adjustment, the current amount of blanking adjustment; and
    a circuit for updating the current amount of blanking adjustment on-screen displayed, when it is changed by the user input command operation, to the changed amount of blanking adjustment as well as updating the amount of adjustment, obtained in the blanking adjustment, stored in the nonvolatile memory to the changed amount of blanking adjustment.

11. The display device according to claim 10, wherein the particular video signal is a video signal into which a signal for copy protection different from the video signal may be inserted in a blanking period.

12. The display device according to claim 10, wherein the particular video signal is a video signal which may be subjected to copy protection by MACROVISION.

* * * * *